(12) United States Patent
Choi et al.

(10) Patent No.: US 12,546,278 B1
(45) Date of Patent: Feb. 10, 2026

(54) METHOD AND DEVICE FOR AUTOMATICALLY CONTROLLING VEHICLE START-UP

(71) Applicants: Hyundai Motor Company, Seoul (KR); Kia Corporation, Seoul (KR)

(72) Inventors: Chan Seok Choi, Hwaseong-Si (KR); Dokon Kim, Hwaseong-Si (KR); Jungmo Yu, Hwaseong-Si (KR); Homin Park, Hwaseong-Si (KR); HyeonSeob Kim, Hwaseong-Si (KR); Gwangseob Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/972,034

(22) Filed: Dec. 6, 2024

(30) Foreign Application Priority Data

Aug. 7, 2024 (KR) .......................... 10-2024-0105023

(51) Int. Cl.
*G06G 7/70* (2006.01)
*B60H 1/32* (2006.01)
*B60R 22/48* (2006.01)
*F02N 11/08* (2006.01)

(52) U.S. Cl.
CPC ....... *F02N 11/0822* (2013.01); *B60H 1/3205* (2013.01); *B60R 22/48* (2013.01); *B60R 2022/4816* (2013.01)

(58) Field of Classification Search
CPC .. F02N 11/0814; F02N 11/00; F02N 11/0803; F02N 11/0807; F02N 11/084; F02N 11/0848; F02N 11/0829
USPC ......................................................... 701/113
See application file for complete search history.

(56) References Cited

U.S. PATENT DOCUMENTS

| | | | |
|---|---|---|---|
| 2017/0276113 A1* | 9/2017 | Hashim | F02N 11/0866 |
| 2018/0362019 A1* | 12/2018 | Singh | F02N 11/0803 |
| 2019/0211764 A1* | 7/2019 | Dudar | F02N 19/00 |

* cited by examiner

*Primary Examiner* — Hung Q Nguyen
*Assistant Examiner* — James J Kim
(74) *Attorney, Agent, or Firm* — Morgan Lewis & Bockius LLP

(57) ABSTRACT

In a method and device for automatically controlling vehicle start-up based on a driver's intention and a vehicle's control state, the method for automatically controlling vehicle start-up may include checking setting of a vehicle start-up automatic control mode, when the vehicle start-up automatic control mode is activated, determining whether an operation condition of the vehicle start-up automatic control mode is satisfied, when the operation condition is satisfied, determining a first control condition for automatically starting the vehicle's start-up, and when the first control condition is satisfied, transmitting a first start-up control signal for automatically starting the vehicle's start-up to a vehicle control unit (VCU).

9 Claims, 7 Drawing Sheets

METHOD AND DEVICE FOR AUTOMATICALLY CONTROLLING VEHICLE START-UP

CROSS-REFERENCE TO RELATED APPLICATION

The present application claims priority to Korean Patent Application No. 10-2024-0105023 filed on Aug. 7, 2024, the entire contents of which is incorporated herein for all purposes by this reference.

BACKGROUND OF THE PRESENT DISCLOSURE

Field of the Present Disclosure

The present disclosure relates to a method and device for automatically controlling vehicle start-up, and more specifically, to a method and device for automatically controlling vehicle start-up based on a driver's intention and a vehicle's control state.

Description of Related Art

A smart key provides a convenient function that allows a driver with a smart key to start a vehicle by simply pressing a start button inside the vehicle without inserting the key through wireless communication with the vehicle. The smart key transmits a unique encrypted signal to a vehicle and goes through an authentication process, and for example, an electronic control unit (ECU) may analyze a signal received from the smart key to determine whether it corresponds to a correct smart key. Once the authentication is complete, the driver may start the vehicle by pressing the brake pedal and pressing the start button while possessing the smart key.

In some electric vehicles, the vehicle may be controlled to be automatically started without pressing the start button based on the driver's boarding and disembarkation. For example, the driver's boarding and disembarkation may be determined based on a driver's seating sensor and whether the smart key is detected indoors or outdoors. However, in this regard, there may be cases where the vehicle may not be started without the driver in the vehicle or the vehicle ignition may not be turned off while the driver is in the vehicle. Furthermore, in such an implementation, it may be difficult to independently control the vehicle ignition regardless of the driver's boarding and disembarkation. Therefore, to prevent the unintended ignition control, a method is required which may actively turn the vehicle on or off based on the driver's intention and the vehicle's control state.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and device for automatically controlling vehicle start-up configured for automatically controlling vehicle's start-up based on a driver's intention and a vehicle's control state.

According to an exemplary embodiment of the present disclosure, a method for automatically controlling vehicle start-up based on a driver's intention and a vehicle's control state includes: checking setting of a vehicle start-up automatic control mode; when the vehicle start-up automatic control mode is activated, determining whether an operation condition of the vehicle start-up automatic control mode is satisfied; when the operation condition is satisfied, determining a first control condition for automatically starting the vehicle's start-up; and when the first control condition is satisfied, transmitting a first start-up control signal for automatically starting the vehicle's start-up to a vehicle control unit (VCU).

In various exemplary embodiments of the present disclosure, the determining of whether the operation condition is satisfied may include: determining whether vehicle to load (V2L) is operating; when the V2L is operating, determining whether the operating V2L is an indoor V2L or an outdoor V2L; when the operating V2L is the indoor V2L, determining whether a utility mode is activated; and when the utility mode is not activated, determining that the operation condition is satisfied.

In various exemplary embodiments of the present disclosure, the determining of whether the operation condition is satisfied may include: determining whether vehicle to load (V2L) is operating; when the V2L is not in operation, determining whether a cargo power is operating; when the cargo power is not in operation, determining whether an air conditioner is operating; and when the air conditioner is not in operation, determining that the operation condition is satisfied.

In various exemplary embodiments of the present disclosure, the determining of whether the operation condition is satisfied may include: when the air conditioner is operating, determining the vehicle's start-up state; and when the vehicle's start-up state is in an OFF state, setting the air conditioner to automatically operate at a preset temperature when the vehicle's start-up is automatically started, and determining that the operation condition is satisfied.

In various exemplary embodiments of the present disclosure, the transmitting of the first start-up control signal may include: determining the vehicle's start-up state; when the vehicle's start-up state is in an OFF state, determining states of a driver's door and a passenger's door; when states of the driver's door and the passenger's door are in a closed state, performing inside detection of a smart key; when the inside detection of the smart key is successful, determining whether a seating sensor is in a seated state or a driver's seat belt is in a fastened state; when the seating sensor is in the seated state or the driver's seat belt is in the fastened state, determining whether a gear is in a P position; and when the gear is in the P position, transmitting the first start-up control signal to the VCU.

In various exemplary embodiments of the present disclosure, the method may further include: when the operation condition is satisfied, determining a second control condition for automatically turning off the vehicle's start-up; and when the second control condition is satisfied, transmitting a second start-up control signal for automatically turning off the vehicle's start-up to the VCU.

In various exemplary embodiments of the present disclosure, the transmitting of the second start-up control signal may include: determining the vehicle's start-up state; when the vehicle's start-up state is in an ON state, determining the state of the driver's door; when the state of the driver's door is in an open state, determining whether the driver's seat belt is in the fastened state; when the driver's seat belt is not in the fastened state, determining whether the seating sensor is in a seated state; when the seating sensor is not in the seated state, determining whether the gear is in the P position; and when the gear is in the P position, transmitting the second start-up control signal to the VCU.

In various exemplary embodiments of the present disclosure, the setting of the vehicle start-up automatic control mode may be performed through an in-vehicle device that interacts with a driver.

In various exemplary embodiments of the present disclosure, the setting of the vehicle start-up automatic control mode may be performed through a user terminal carried by the driver that communicates with the vehicle.

In various exemplary embodiments of the present disclosure, the first start-up control signal and the second start-up control signal may be transmitted from a body domain control unit (BDC) to the VCU.

According to another exemplary embodiment of the present disclosure, there is provided a device for automatically controlling vehicle start-up, which automatically controls the vehicle's start-up based on a driver's intention and a vehicle's control state by executing a program code loaded into one or more memory devices through one or more processors, in which the program code is executed to check setting of a vehicle start-up automatic control mode, when the vehicle start-up automatic control mode is activated, determine whether an operation condition of the vehicle start-up automatic control mode is satisfied, when the operation condition is satisfied, determine a first control condition for automatically starting the vehicle's start-up, and when the first control condition is satisfied, transmit a first start-up control signal for automatically starting the vehicle's start-up to a vehicle control unit (VCU).

In various exemplary embodiments of the present disclosure, the determining of whether the operation condition is satisfied may include determining whether vehicle to load (V2L) is operating, when the V2L is operating, determining whether the operating V2L is an indoor V2L or an outdoor V2L, when the operating V2L is the indoor V2L, determining whether a utility mode is activated, and when the utility mode is not activated, determining that the operation condition is satisfied.

In various exemplary embodiments of the present disclosure, the determining of whether the operation condition is satisfied may include determining whether vehicle to load (V2L) is operating, when the V2L is not in operation, determining whether a cargo power is operating, when the cargo power is not in operation, determining whether an air conditioner is operating, and when the air conditioner is not in operation, determining that the operation condition is satisfied.

In various exemplary embodiments of the present disclosure, the determining of whether the operation condition is satisfied may include when the air conditioner is operating, determining the vehicle's start-up state, and when the vehicle's start-up state is in an OFF state, setting the air conditioner to automatically operate at a preset temperature when the vehicle's start-up is automatically started, and determining that the operation condition is satisfied.

In various exemplary embodiments of the present disclosure, the transmitting of the first start-up control signal may include determining the vehicle's start-up state, when the vehicle's start-up state is in an OFF state, determining the states of a driver's door and a passenger's door, when states of the driver's door and the passenger's door are in a closed state, performing inside detection of a smart key, when the inside detection of the smart key is successful, determining whether a seating sensor is in a seated state or a driver's seat belt is in a fastened state, when the seating sensor is in the seated state or the driver's seat belt is in the fastened state, determining whether a gear is in a P position, and when the gear is in the P position, transmitting the first start-up control signal to the VCU.

In various exemplary embodiments of the present disclosure, the program code may be further executed to, when the operation condition is satisfied, determine a second control condition for automatically turning off the vehicle's start-up, and when the second control condition is satisfied, transmit a second start-up control signal for automatically turning off the vehicle's start-up to the VCU.

In various exemplary embodiments of the present disclosure, the transmitting of the second start-up control signal may include determining the vehicle's start-up state, when the vehicle's start-up state is in an ON state, determining the state of the driver's door, when the state of the driver's door is in an open state, determining whether the driver's seat belt is in the fastened state, when the driver's seat belt is not in the fastened state, determining whether the seating sensor is in a seated state, when the seating sensor is not in the seated state, determining whether the gear is in the P position, and when the gear is in the P position, transmitting the second start-up control signal to the VCU.

In various exemplary embodiments of the present disclosure, the setting of the vehicle start-up automatic control mode may be performed through an in-vehicle device that interacts with a driver.

In various exemplary embodiments of the present disclosure, the setting of the vehicle start-up automatic control mode may be performed through a user terminal carried by the driver that communicates with the vehicle.

In various exemplary embodiments of the present disclosure, the first start-up control signal and the second start-up control signal may be transmitted from a body domain control unit (BDC) to the VCU.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

Figure 1:
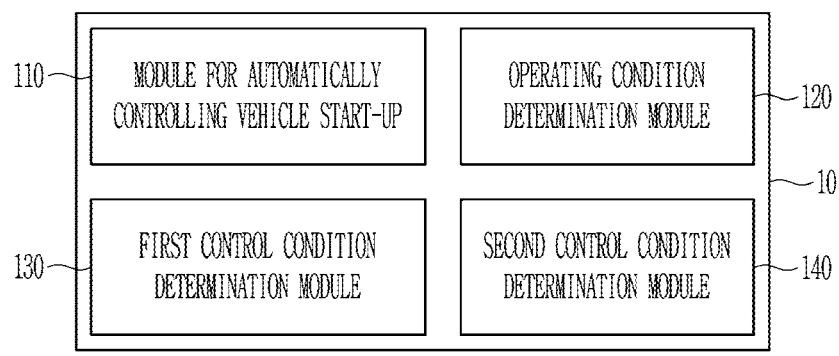
FIG. 1 is a diagram for describing a device for automatically controlling vehicle start-up according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements. Terms including an ordinal number such as first, second, etc., may be used to describe various components, but the components are not limited to these terms. The above terms are used solely for distinguishing one component from another.

Terms such as " . . . unit", " . . . er/or", and "module" used in the specification may mean a unit configured for processing at least one function or operation described in the specification, which may be implemented as hardware or a circuit, software, or a combination of hardware or circuit and software. Furthermore, at least some components or functions of a method and device for automatically controlling vehicle start-up according to the exemplary embodiments to be described below may be implemented as a program or software, and the program or software may be stored on a computer-readable medium.

FIG. 1 is a diagram for describing a device for automatically controlling vehicle start-up according to an exemplary embodiment of the present disclosure.

Referring to FIG. 1, a device 10 for automatically controlling vehicle start-up according to various exemplary embodiments of the present disclosure may execute program codes or instructions loaded in one or more memory devices through one or more processors. For example, a device 10 for automatically controlling vehicle start-up may be implemented as a computing device 50 as described below with reference to FIG. 6. In the instant case, one or more processors may correspond to a processor 510 of a computing device 50, and one or more memory devices may correspond to a memory 530 of the computing device 50. The program codes or instructions may be executed by one or more processors to perform a function of automatically controlling vehicle's start-up based on a driver's intention and a vehicle's control state. In the present specification, the term "module" is used to logically distinguish these functions performed by the program codes or instructions.

The device 10 for automatically controlling vehicle start-up according to various exemplary embodiments of the present disclosure may include a module 110 for automatically controlling vehicle start-up, an operation condition determination module 120, a first control condition determination module 130, and a second control condition determination module 140.

Herein, in an exemplary embodiment of the present disclosure, the operation condition determination module 120, the first control condition determination module 130, and the second control condition determination module 140 may be implemented as separate processors. Alternatively, the operation condition determination module 120, the first control condition determination module 130, and the second control condition determination module 140 may be implemented as a single integrated processor.

The module 110 for automatically controlling vehicle start-up may check setting of the vehicle start-up automatic control mode. The vehicle start-up automatic control mode is an operating mode that automatically controls the vehicle's start-up based on the driver's intention and the vehicle's control state, and may be set to be activated or deactivated by a driver or other control means of the vehicle. In various exemplary embodiments of the present disclosure, the driver may set whether to activate the vehicle start-up automatic control mode through the device in the vehicle which may interact with the driver, such as an in-vehicle infotainment (IVI). In some other embodiments, the driver may set whether to activate the vehicle start-up automatic control mode through a user terminal carried by the driver and communicates with the vehicle. Here, the user terminal may include, for example, a computing device including a smart phone, a tablet computer, a wearable device, and a laptop computer, etc. When the vehicle start-up automatic control mode is deactivated, the vehicle start-up may not be automatically controlled based on the driver's intention and the vehicle's control state.

The operation condition determination module 120 may be configured to determine whether the operation condition of the vehicle start-up automatic control mode is satisfied when the vehicle start-up automatic control mode is activated. Here, the operation condition may be a condition that should be satisfied in advance to determine a control condition for automatically starting the vehicle's start-up or a control condition for automatically turning off the vehicle's start-up. In other words, when the operation condition is not satisfied, even if the vehicle start-up automatic control mode is activated, the determination of the control condition for automatically starting the vehicle's start-up or the control condition for automatically turning off the vehicle's start-up may not be performed.

In various exemplary embodiments of the present disclosure, the operation condition determination module 120 may perform the following detailed steps to determine whether the operation conditions of the vehicle start-up automatic control mode are satisfied. The operation condition determination module 120 may be configured to determine whether vehicle to load (V2L) is operating. The V2L is one of the technologies utilizing a large-capacity battery of an electric vehicle, and may be a technology in which the electric vehicle supplies AC power to external electronic devices. In other words, the V2L may be a technology that converts high-voltage DC electricity into AC electricity which may be used by general household electronic devices and supplies the AC electricity to a power supply connected to the vehicle so that electrical energy stored in a battery mounted on the electric vehicle may be used externally.

When the V2L is operating, the operation condition determination module 120 may be configured to determine whether the operating V2L is an indoor V2L or an outdoor V2L. The operation condition determination module 120 may be configured to determine whether the operating V2L is an indoor V2L or an outdoor V2L by electrically detecting which outlet of internal and external outlets of the vehicle is connected to the electronic device that wants to use the V2L. When the electronic device that wants to use the V2L is detected to be connected to the internal outlet of the vehicle, the operation condition determination module 120 may be configured to determine that the operating V2L is the indoor V2L. In contrast, when the electronic device that wants to use the V2L is detected to be connected to the external outlet of the vehicle, the operation condition determination module 120 may be configured to determine that the operating V2L is the outdoor V2L.

When operating V2L is the outdoor V2L, the operation condition determination module 120 may stop the progress of the subsequent operation and perform the determination on whether the V2L is operating again. In contrast, when the operating V2L is the indoor V2L, the operation condition determination module 120 may be configured to determine whether a utility mode is activated. The utility mode is one of power transition modes of the vehicle, and may be a mode that allows the use of electric devices while the engine is turned off. For example, in situations such as when the vehicle is stopping or camping, the electric devices may be used without turning on the engine through the utility mode. When utility mode is not activated, the operation condition determination module 120 may be configured to determine that the operation condition of the vehicle start-up automatic control mode is satisfied. Accordingly, the operation of determining the control condition for automatically starting the vehicle's start-up or determining the control condition for automatically turning off the vehicle's start-up may be performed subsequently.

In various exemplary embodiments of the present disclosure, the operation condition determination module 120 may perform the following detailed steps to determine whether the operation conditions of the vehicle start-up automatic control mode are satisfied. The operation condition determination module 120 may be configured to determine whether the V2L is operating. When the V2L is not in operation, the operation condition determination module 120 may be configured to determine whether a cargo power is operating. When the cargo power is operating, the operation condition determination module 120 may stop the subsequent operation and perform the determination again on whether the operation condition of the vehicle start-up automatic control mode is satisfied. Alternatively, when the cargo power is not in operation, the operation condition determination module 120 may be configured to determine whether the air conditioner is operating. When the air conditioner is not in operation, the operation condition determination module 120 may be configured to determine that the operation condition of the vehicle start-up automatic control mode is satisfied.

In contrast, when the air conditioner is operating, the operation condition determination module 120 may be configured to determine the vehicle's start-up state. When the vehicle's start-up state is in an OFF state, the operation condition determination module 120 may be configured to determine that it is currently in an after-blow operation state, set the air conditioner to automatically operate at a preset temperature when the vehicle's start-up is automatically started, and determine that the operating state of the vehicle start-up automatic control mode is satisfied. When the vehicle's start-up state is in an ON state, the operation condition determination module 120 may stop the subsequent operation and perform the determination again on whether the operation condition of the vehicle start-up automatic control mode is satisfied.

The first control condition determination module 130 may be configured to determine the first control condition for automatically starting the vehicle's start-up when the operation condition is satisfied by the operation condition determination module 120. Furthermore, when the first control condition is satisfied, the first control condition determination module 130 may transmit the first start-up control signal for automatically starting the vehicle's start-up to a vehicle control unit (VCU) including a processor.

In various exemplary embodiments of the present disclosure, the first control condition determination module 130 may be configured to determine the vehicle's start-up state. When vehicle's start-up state is in the ON state, the first control condition determination module 130 may stop the subsequent operation and return to the time before starting the determination of the first control condition.

When the vehicle's start-up state is in the OFF state, the first control condition determination module 130 may be configured to determine the states of the driver's door and the passenger's door. When the state of the driver's door or the passenger's door is in the open state, the first control condition determination module 130 may stop the subsequent operation and return to the time before starting the determination of the first control condition.

When the state of the driver's door and the passenger's door is in a closed state, the first control condition determination module 130 may perform inside detection of the smart key. When the inside detection of the smart key fails, the first control condition determination module 130 may stop the subsequent operation and return to the time before starting the determination of the first control condition.

When the inside detection of the smart key is successful, the first control condition determination module 130 may be configured to determine whether the seating sensor is in a seated state or the driver's seat belt is in a fastened state. When the seating sensor is not in the seated state and the driver's seat belt is not in the fastened state, the first control condition determination module 130 may stop the subsequent operation and return to the time before starting the determination of the first control condition.

When the seating sensor is in the seated state or the driver's seat belt is in the fastened state, the first control condition determination module 130 may be configured to determine whether the gear is in a P position. When the gear is not in the P position, the first control condition determination module 130 may stop the subsequent operation and return to the time before starting the determination of the first control condition. In contrast, when the gear is in the P position, the first control condition determination module 130 may transmit a first start-up control signal to the VCU.

The second control condition determination module 140 may be configured to determine a second control condition for automatically turning off the vehicle's start-up when the operation condition is satisfied by the operation condition determination module 120. Furthermore, when the second control condition is satisfied, the second control condition determination module 140 may transmit a second start-up control signal for automatically turning off the vehicle's start-up to the VCU.

In various exemplary embodiments of the present disclosure, the second control condition determination module 140 may be configured to determine the vehicle's start-up state. When the vehicle's start-up state is the OFF state, the second control condition determination module 140 may stop the subsequent operation and return to the time before starting the determination of the second control condition.

When the vehicle's start-up state is in the ON state, the second control condition determination module 140 may be configured to determine the state of the driver's door. When the state of the driver's door is in the closed state, the second control condition determination module 140 may stop the subsequent operation and return to the time before starting the determination of the second control condition.

When the driver's seat door is in the open state, the second control condition determination module 140 may be configured to determine whether the driver's seat belt is in the fastened state. When the driver's seat belt is in the fastened state, the second control condition determination module 140 may stop the subsequent operation and return to the time before starting the determination of the second control condition.

When the driver's seat belt is not in the fastened state, the second control condition determination module 140 may be configured to determine whether the seating sensor is in the seated state. When the seating sensor is in the seated state, the second control condition determination module 140 may stop the subsequent operation and return to the time before starting the determination of the second control condition.

When the seating sensor is not in the seated state, the second control condition determination module 140 may be configured to determine whether the gear is in the P position. When gear is not in the P gear, the second control condition determination module 140 may stop the subsequent operation and return to the point before the determination of the second control condition is started. Alternatively, when the gear is in the P position, the second control condition determination module 140 may transmit the second start-up control signal to the VCU.

According to the exemplary embodiment of the present disclosure, based on the determination flow described above, the driver's intention and the vehicle control state may be considered, and the vehicle start-up may be automatically controlled based thereon. In the case of the special purpose vehicles such as a refrigerated truck or an ambulance, when the cargo power loaded with the refrigerated goods or medical goods is operating, the start-up may be prevented from being automatically turned off unintentionally, or when the air conditioner is operating while the air conditioner or heater is operating, the start-up may be kept turned on and the air conditioner may be kept in operation when the driver for a predetermined time period gets off the vehicle, improving the convenience of the driver when he or she re-boards the vehicle. Furthermore, it is possible to provide the driver with the automatic start-up control appropriate for various situations in relation to the V2L function.

Figure 2:
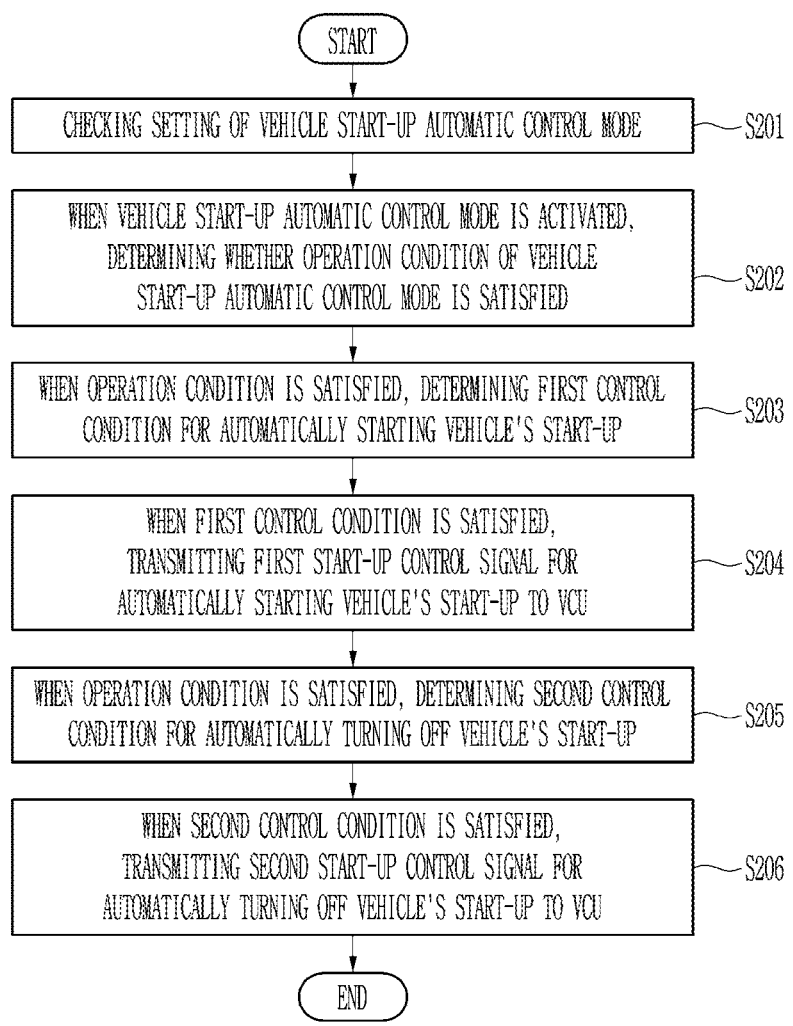
FIG. 2 is a diagram for describing a method for automatically controlling vehicle start-up according to an exemplary embodiment of the present disclosure.

FIG. 2 is a diagram for describing a method for automatically controlling vehicle start-up according to an exemplary embodiment of the present disclosure.

Referring to FIG. 2, the method for automatically controlling vehicle start-up according to various exemplary embodiments of the present disclosure may include checking the setting of the vehicle start-up automatic control mode (S201), when the vehicle start-up automatic control mode is activated, determining whether the operation condition of the vehicle start-up automatic control mode is satisfied (S202), when the operation condition is satisfied, determining the first control condition for automatically starting the vehicle's start-up (S203), when the first control condition is satisfied, transmitting the first start-up control signal for automatically starting the vehicle's start-up to the VCU (S204), when the operation condition is satisfied, determining the second control condition for automatically turning off the vehicle's start-up (S205), and when the second control condition is satisfied, transmitting a second start-up control signal for automatically turning off the vehicle's start-up to the VCU (S206).

For further details on the method, reference may be made to the description of the exemplary embodiments described in the present specification, and therefore, redundant description thereof will be omitted here.

FIG. 3, FIG. 4A and FIG. 4B, and FIG. 5 are diagrams for describing implementation examples of a method and device for automatically controlling vehicle start-up according to various exemplary embodiments of the present disclosure.

Figure 3:
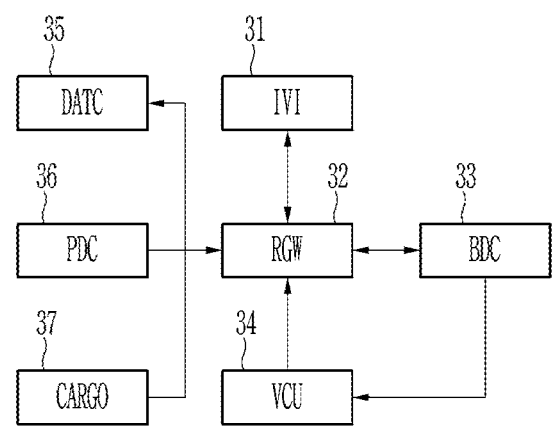
FIG. 3, FIG. 4A and FIG. 4B, and FIG. 5 are diagrams for describing implementation examples of a method and device for automatically controlling vehicle start-up according to various exemplary embodiments of the present disclosure.
Figure 4A:
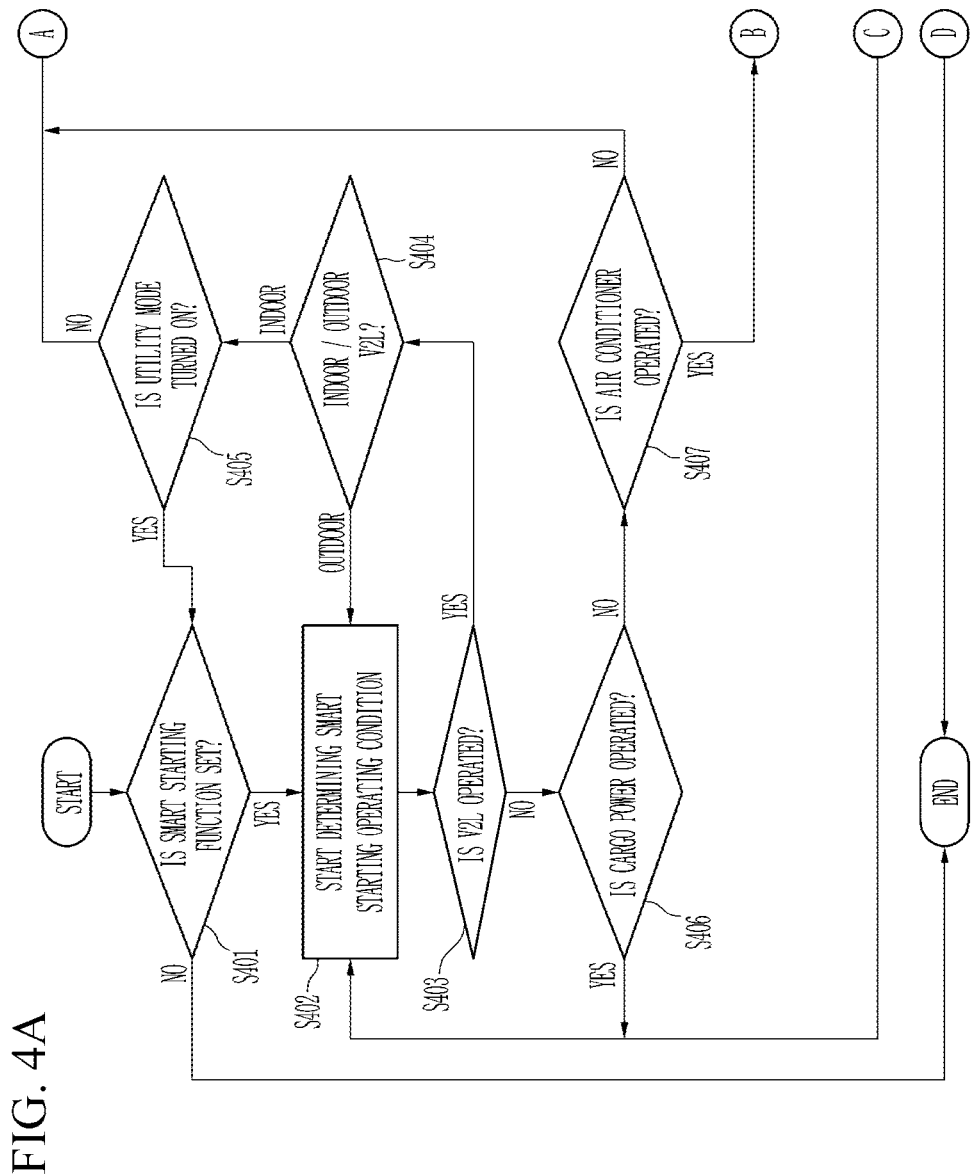
Figure 4B:
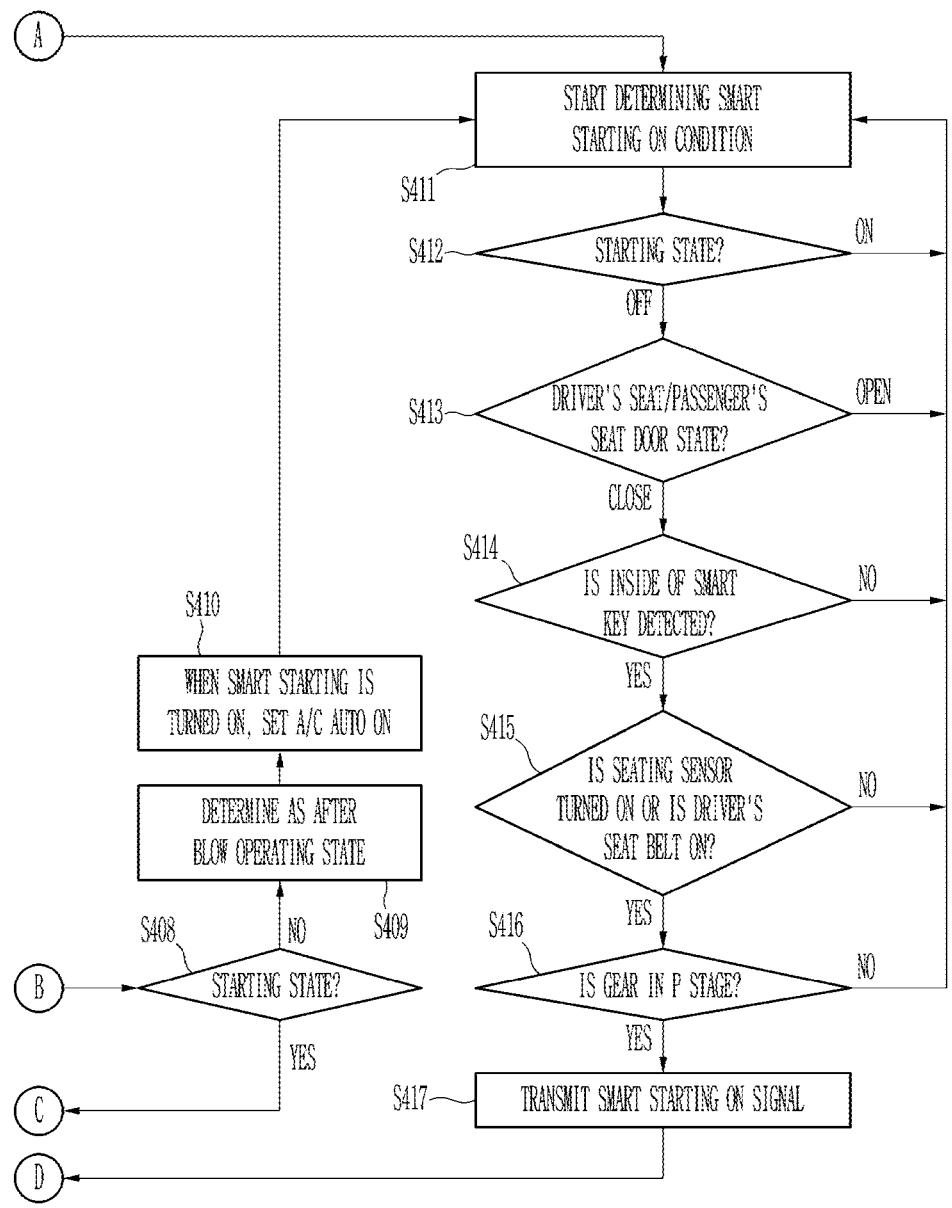
Figure 5:
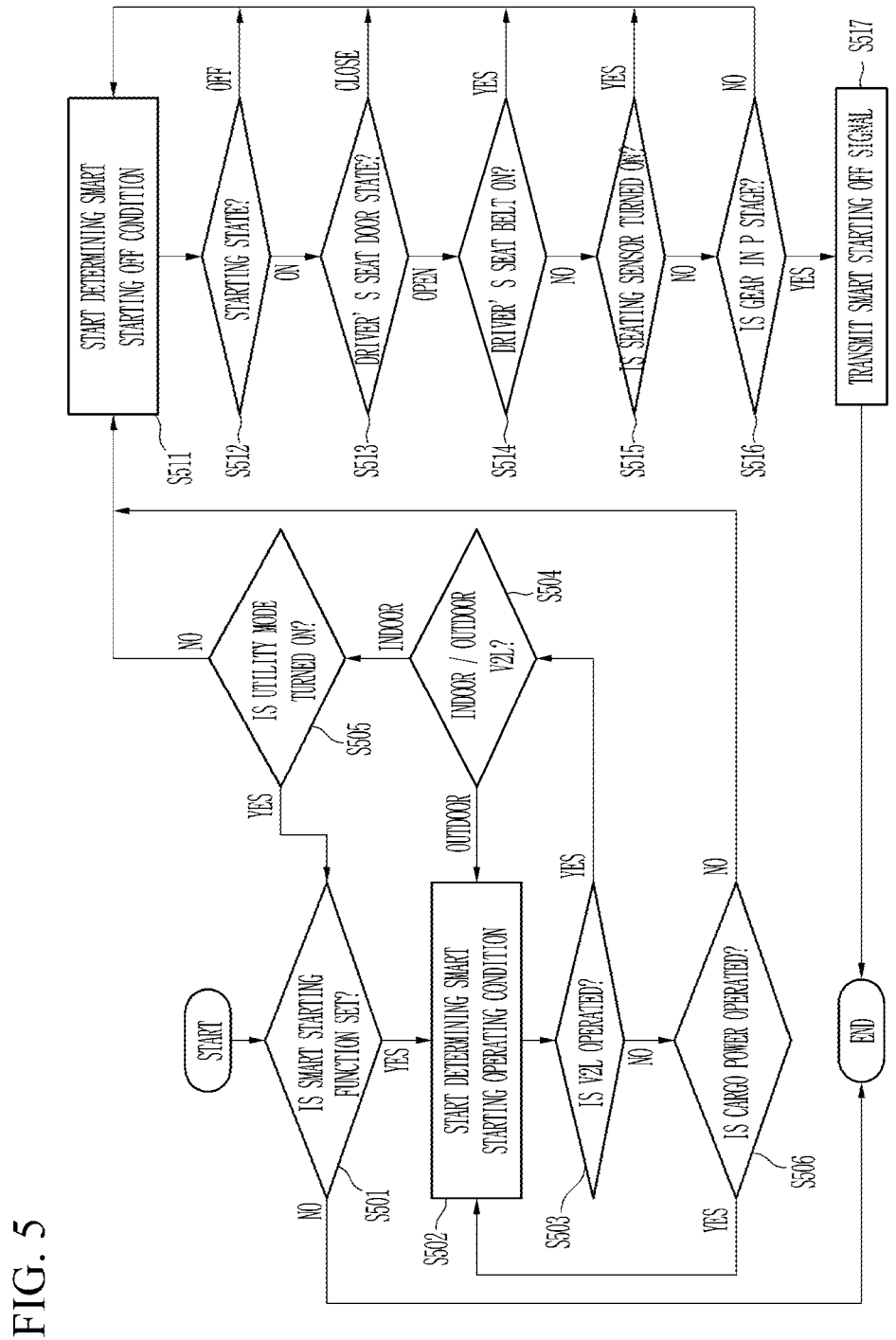

Referring to FIG. 3, a device for automatically controlling vehicle start-up according to various exemplary embodiments of the present disclosure may include an IVI 31, a redundant gate way (RGW) 32, a body domain control unit (BDC) 33, a vehicle control unit (VCU) 34, a dual automate temperature control (DATC) 35, a power domain controller (PDC) 36, and a cargo 37. In FIGS. 4A, 4B and 5, when a performance subject of the step performed in the method is not explicitly described, it may be understood that the performance subject of the step is the RGW 32.

Referring to FIG. 4A and FIG. 4B, a method for automatically controlling vehicle start-up according to various exemplary embodiments of the present disclosure may perform a step (S401) of determining whether the smart start function is set. Here, the smart start function may mean a function that automatically controls the vehicle's start-up based on the driver's intention and the vehicle's control state as described above, i.e., a function of automatically controlling the vehicle start-up or the vehicle start-up automatic control mode. When it is determined that the smart start function is set (S401, Yes), the method may perform a step (S402) of starting to determine a smart start operation condition and a step (S403) of determining whether the V2L is operating. In contrast, when it is determined that the smart start function is not set (S401, No), the method may end.

When the V2L is operating (S403, Yes), the method may perform a step (S404) of determining whether the operating V2L is the indoor V2L or the outdoor V2L. When the operating V2L is the outdoor V2L, the method may proceed to step (S402). Alternatively, when the operating V2L is the indoor V2L, the method may perform a step (S405) of determining whether the utility mode is activated. When the utility mode is not activated (S405, No), the method may proceed to step (S411) of starting to determine the "smart start On condition". Here, the "smart start On condition" may mean the first control condition for automatically starting the vehicle's start-up as described above. In contrast, when the utility mode is activated (S405, Yes), this does not correspond to the starting state, so that the method may proceed to step (S401).

Meanwhile, when the V2L is not in operation (S403, No), the method may perform a step (S406) of determining whether the cargo power is operating. When the cargo power is operating (S406, Yes), the method may proceed to step (S402). In contrast, when the cargo power is not in operation (S406, No), the method may perform step (S407) of determining whether the air conditioner is operating. When the air conditioner is not in operation (S407, No), the method may proceed to the step (S411) of starting to determine the "smart start On condition".

In contrast, when the air conditioner is operating (S407, Yes), the method may perform a step (S408) of determining whether the vehicle is in the starting state. When the vehicle's start-up state is in the OFF state (S408, No), the method may perform a step (S409) of determining the current after-blow state and a step (S410) of setting the air conditioner to automatically operate at a preset temperature (e.g., 22° C.) when the smart start is On, that is, when the vehicle's start-up is automatically started, and then proceed to a step (S411) of starting to determine the "smart start On condition."

When the vehicle's start-up state is in the ON state (S408, Yes), the method may proceed to a step (S402).

After starting to determine the "smart start On condition" in step (S411), the method may perform a step (S412) of determining the vehicle's start-up state. When the vehicle's start-up state is in the ON state (S412, ON), the method may proceed to step (S411).

When the vehicle's start-up state is in the OFF state (S412, OFF), the method may perform a step (S413) of determining the state of the driver's door and the passenger's door. When the state of the driver's door or the passenger's door is in the open state (S413, OPEN), the method may proceed to step (S411).

When the states of the driver's door and the passenger's door are in the closed state (S413, CLOSE), the method may perform step (S414) of performing the inside detection of the smart key. When the inside detection of the smart key fails (S414, NO), the method may proceed to step (S411).

When the inside detection of the smart key succeeds (S414, YES), the method may perform a step (S415) of determining whether the seating sensor is in the seated state or the driver's seat belt is in the fastened state. When the seating sensor is not in the seated state and the driver's seat belt is not in the fastened state (S415, No), the method may proceed to step (S411).

When the seating sensor is in the seated state or the driver's seat belt is in the fastened state (S415, Yes), the method may perform a step (S416) of determining whether the gear is in the P position. When the gear is not in the P position (S416, No), the method may proceed to step (S411). Alternatively, when the gear is in the P position (S416, Yes), the method may perform a step (S417) of transmitting the "smart start On signal" to the VCU. Here, the "smart start On signal" may mean the first start-up control signal for automatically starting the vehicle's start-up as described above.

Referring to FIG. 5, the method for automatically controlling vehicle start-up according to various exemplary embodiments of the present disclosure may perform determining whether the smart start function is set (S501). Here, the smart start function may mean a function that automatically controls the vehicle's start-up based on the driver's intention and the vehicle's control state as described above, i.e., a function of automatically controlling the vehicle start-up or the vehicle start-up automatic control mode. When it is determined that the smart start function is set (S501, Yes), the method may perform a step (S502) of starting to determine a smart start operation condition and a step (S503) of determining whether the V2L is in operation. In contrast, when it is determined that the smart start function is not set (S501, No), the method may end.

When the V2L is in operation (S503, Yes), the method may perform a step (S504) of determining whether the operating V2L is the indoor V2L or the outdoor V2L. When the operating V2L is the outdoor V2L, the method may proceed to step (S502). Alternatively, when the operating V2L is the indoor V2L, the method may perform a step (S505) of determining whether the utility mode is activated. When the utility mode is not activated (S505, No), the method may proceed to step (S511) of starting to determine the "smart start Off condition". Here, the "smart start Off condition" may mean the second control condition for automatically turning off the vehicle's start-up as described above. In contrast, when the utility mode is activated (S505, Yes), this does not correspond to the starting state, so that the method may proceed to step (S501).

Meanwhile, when the V2L is not in operation (S503, No), the method may perform a step (S506) of determining whether the cargo power is in operation. When the cargo power is in operation (S506, Yes), the method may proceed to step (S502). In contrast, when the cargo power is not in operation (S506, No), the method may proceed to the step (S511) of starting to determine the "smart start Off condition".

After starting to determine the "smart start Off condition" in step (S511), the method may perform a step (S512) of determining the vehicle's start-up state. When the vehicle's start-up state is in the OFF state (S512, OFF), the method may proceed to step (S511).

When the vehicle's start-up state is in the ON state (S512, ON), the method may perform a step (S513) of determining the state of the driver's door. When the state of the driver's seat door is in the closed state (S513, CLOSE), the method may proceed to step (S511).

When the state of the driver's seat door is in the open state (S513, OPEN), the method may perform step (S514) of determining whether the driver's seat belt is in the fastened state. When the driver's seat belt is in the fastened state (S514, YES), the method may proceed to step (S511).

When the driver's seat belt is not in the fastened state (S514, NO), the method may perform a step (S515) of determining whether the seating sensor is in the seated state. When the seating sensor is in the seated state (S515, YES), the method may proceed to step (S511).

When the seating sensor is not in the seated state (S515, NO), the method may perform a step (S516) of determining whether the gear is in the P position thereof. When the gear is not in the P position (S516, No), the method may proceed to step (S511). In contrast, when the gear is in the P position (S516, Yes), the method may perform a step (S517) of transmitting the "smart start Off signal" to the VCU. Here, the "smart start Off signal" may mean the second start-up control signal for automatically starting the vehicle's start-up as described above.

Figure 6:
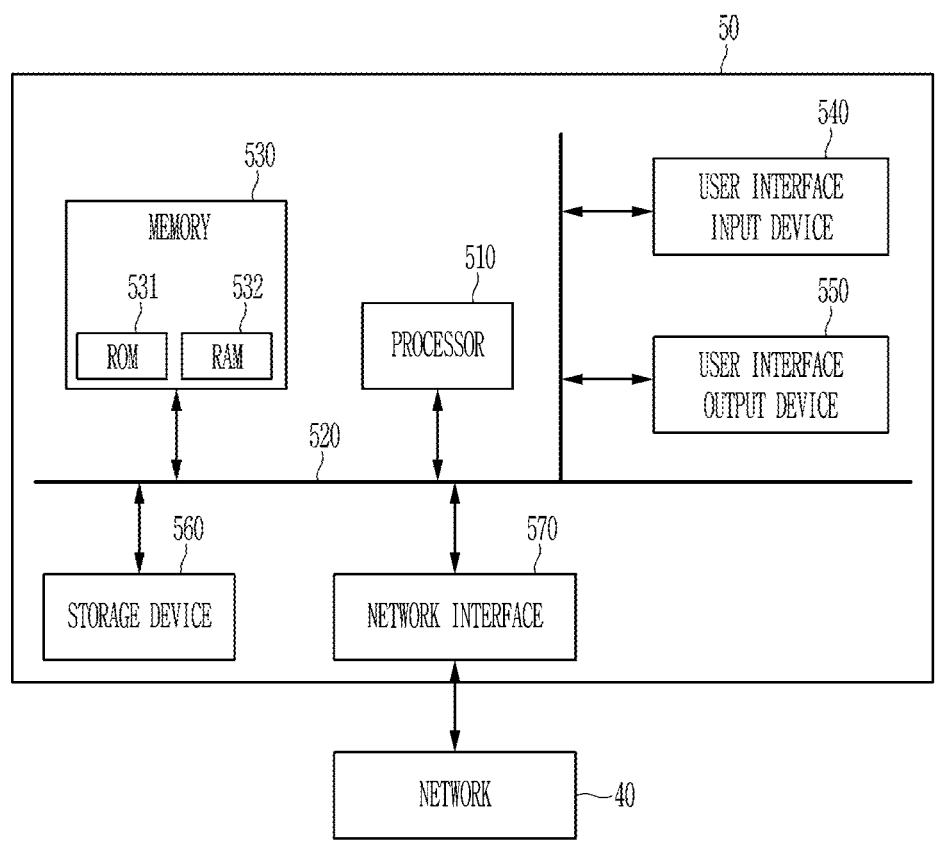
FIG. 6 is a diagram for describing a computing device according to an exemplary embodiment of the present disclosure.

FIG. 6 is a diagram for describing a computing device according to an exemplary embodiment of present disclosure.

Referring to FIG. 6, the method and device for controlling vehicle start-up according to the exemplary embodiments of the present disclosure may be implemented using a computing device 50.

The computing device 50 may include at least one of a processor 510, a memory 530, a user interface input device 540, a user interface output device 550, and a storage device 560 that communicate via a bus 520. The computing device 50 may also include a network interface 570 which is electrically connected to a network 40. The network interface 570 may transmit or receive signals to or from other entities through the network 40.

The processor 510 may be implemented in various types such as a micro controller unit (MCU), an application processor (AP), a central processing unit (CPU), a graphic processing unit (GPU), a neural processing unit (NPU), and a quantum processing unit (QPU) may be any semiconductor device that executes instructions stored in the memory 530 or the storage device 560. The processor 510 may be configured to implement the functions and methods described above with reference to FIG. 1, FIG. 2, FIG. 3, FIG. 4A and FIG. 4B, and FIG. 5.

The memory 530 and the storage device 560 may include various types of volatile or non-volatile storage media. For example, the memory may include a read only memory (ROM) 531 and a random access memory (RAM) 532. In various exemplary embodiments of the present disclosure, the memory 530 may be positioned inside or outside the processor 510, and the memory 530 may be connected to the processor 510 through various means that are well-known.

In various exemplary embodiments of the present disclosure, at least some components or functions of the method and device for automatically controlling vehicle start-up according to the exemplary embodiments of the present disclosure may be implemented as a program or software running on the computing device 50, and the program or software may be stored on a computer-readable medium. A computer-readable medium according to various exemplary embodiments of the present disclosure may be a medium in which a program for executing steps included in the implementation of the method and device for automatically controlling vehicle start-up according to the exemplary embodiments is recorded in a computer including the processor 510 executing a program or instruction stored in the memory 530 or the storage device 560.

In various exemplary embodiments of the present disclosure, at least some components or functions of the method and device for controlling vehicle start-up according to the exemplary embodiments are implemented using hardware or circuits of the computing device 50, or may be implemented as separate hardware or circuit which may be electrically connected to the computing device 50.

According to various exemplary embodiments of the present disclosure, it is possible to automatically control the vehicle start-up based on the driver's intention and the vehicle's control state. In the case of the special purpose vehicles such as a refrigerated truck or an ambulance, when the cargo power loaded with the refrigerated goods or medical goods is in operation, the start-up may be prevented from being automatically turned off unintentionally, or when the air conditioner is in operation while the air conditioner or heater is in operation, the start-up may be kept turned on and the air conditioner may be kept in operation when the driver temporarily gets off the vehicle, improving the convenience of the driver when he or she re-boards the vehicle. Furthermore, it is possible to provide the driver with the automatic start-up control appropriate for various situations in relation to the V2L function.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), Silicon Disk Drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for automatically controlling vehicle start-up, which automatically controls the vehicle's start-up based on a driver's intention and a vehicle's control state by executing a program code loaded into one or more memory devices through at least one processor,
wherein the program code is executed to:
check setting of a vehicle start-up automatic control mode,
in response that the vehicle start-up automatic control mode is activated, determine whether an operation condition of the vehicle start-up automatic control mode is satisfied,
in response that the operation condition is satisfied, determine a first control condition for automatically starting the vehicle's start-up, and in response that the first control condition is satisfied,
transmit a first start-up control signal for automatically starting the vehicle's start-up to a vehicle control unit (VCU),
wherein the transmitting of the first start-up control signal includes:
determining the vehicle's start-up state,
in response that the vehicle's start-up state is in an OFF state, determining the states of the driver's door and a passenger's door,
in response that states of the driver's door and the passenger's door are in a closed state, performing inside detection of a smart key,
in response that the inside detection of the smart key is successful, determining whether a seating sensor is in a seated state or the driver's seat belt is in a fastened state,
in response that the seating sensor is in the seated state or the driver's seat belt is in the fastened state, determining whether a gear is in a P position, and
in response that the gear is in the P position, transmitting the first start-up control signal to the VCU.

2. The apparatus of claim 1, wherein the determining of whether the operation condition is satisfied includes:
determining whether vehicle to load (V2L) is operating,
in response that the V2L is operating, determining whether the operating V2L is an indoor V2L or an outdoor V2L,
in response that the operating V2L is the indoor V2L, determining whether a utility mode is activated, and
in response that the utility mode is not activated, concluding that the operation condition is satisfied.

3. The apparatus of claim 1, wherein the determining of whether the operation condition is satisfied includes:
determining whether vehicle to load (V2L) is operating,
in response that the V2L is not in operation, determining whether a cargo power is operating,
in response that the cargo power is not in operation, determining whether an air conditioner is operating, and
in response that the air conditioner is not in operation, concluding that the operation condition is satisfied.

4. The apparatus of claim 3, wherein the determining of whether the operation condition is satisfied includes:
in response that the air conditioner is operating, determining the vehicle's start-up state, and
in response that the vehicle's start-up state is in an OFF state, setting the air conditioner to automatically operate at a preset temperature in response that the vehicle's start-up is automatically started, and concluding that the operation condition is satisfied.

5. The apparatus of claim 1, wherein the program code is further executed to:
in response that the operation condition is satisfied, determine a second control condition for automatically turning off the vehicle's start-up, and
in response that the second control condition is satisfied, transmit a second start-up control signal for automatically turning off the vehicle's start-up to the VCU.

6. The apparatus of claim 5, wherein the transmitting of the second start-up control signal includes:
determining the vehicle's start-up state,
in response that the vehicle's start-up state is in an ON state, determining a state of the driver's door,
in response that the state of the driver's door is in an open state, determining whether the driver's seat belt is in a fastened state,
in response that the driver's seat belt is not in the fastened state, determining whether a seating sensor is in a seated state,
in response that the seating sensor is not in the seated state, determining whether a gear is in a P position, and
in response that the gear is in the P position, transmitting the second start-up control signal to the VCU.

7. The apparatus of claim 1, wherein the setting of the vehicle start-up automatic control mode is performed through an in-vehicle device that interacts with the driver.

8. The apparatus of claim 7, wherein the setting of the vehicle start-up automatic control mode is performed through a user terminal carried by the driver that communicates with the vehicle.

9. The apparatus of claim 5, wherein the first start-up control signal and the second start-up control signal are transmitted from a body domain control unit (BDC) to the VCU.

* * * * *